(12) United States Patent
Fayfer et al.

(10) Patent No.: US 9,852,335 B2
(45) Date of Patent: Dec. 26, 2017

(54) METHOD OF PROCESSING A VISUAL OBJECT

(71) Applicant: YANDEX EUROPE AG, Lucerne (CH)

(72) Inventors: Sergey Aleksandrovich Fayfer, Moscow (RU); Anton Viktorovich Slesarev, Republic of Tatarstan (RU); Alexander Alexandrovich Chigorin, Moscow region (RU)

(73) Assignee: YANDEX EUROPE AG, Luzern (CH)

( * ) Notice: Subject to any disclaimer, the term of this patent is extended or adjusted under 35 U.S.C. 154(b) by 0 days.

(21) Appl. No.: 15/109,851

(22) PCT Filed: Dec. 1, 2014

(86) PCT No.: PCT/IB2014/066481
§ 371 (c)(1),
(2) Date: Jul. 6, 2016

(87) PCT Pub. No.: WO2015/181589
PCT Pub. Date: Dec. 3, 2015

(65) Prior Publication Data
US 2016/0328608 A1 Nov. 10, 2016

(30) Foreign Application Priority Data
May 29, 2014 (RU) ................. 2014122127

(51) Int. Cl.
*G06K 9/00* (2006.01)
*G06Q 10/10* (2012.01)
(Continued)

(52) U.S. Cl.
CPC ....... *G06K 9/00456* (2013.01); *G06F 3/0488* (2013.01); *G06F 3/04842* (2013.01);
(Continued)

(58) Field of Classification Search
None
See application file for complete search history.

(56) References Cited

U.S. PATENT DOCUMENTS 7,283,669 B2  10/2007  Andel et al.
8,447,752 B2   5/2013  Wang et al.
(Continued)

FOREIGN PATENT DOCUMENTS

RU   2284670 C9   11/2001
RU   2421810 C2    6/2006
(Continued)

OTHER PUBLICATIONS

International Search Report from PCT/IB2014/066481, Apr. 1, 2015, Lee W. Young.
(Continued)

*Primary Examiner* — Delomia L Gilliard
(74) *Attorney, Agent, or Firm* — BCF LLP

(57) ABSTRACT

A computer-implemented method executed on an electronic device, the electronic device having a display screen, the method comprising: displaying an image on the display screen; receiving a user selection of a first portion of the image; responsive to the user selection of the first portion of the image, the first portion of the image containing a selected text portion, performing text recognition of the selected text portion and of an unselected text portion, the unselected text portion located in a second portion of the image being distinct from the first portion of the image, to render a recognized text element.

18 Claims, 12 Drawing Sheets

(51) Int. Cl.
*G06K 9/20* (2006.01)
*G06K 9/22* (2006.01)
*G06F 3/0484* (2013.01)
*G06F 3/0488* (2013.01)

(52) U.S. Cl.
CPC ............. *G06K 9/2081* (2013.01); *G06K 9/22* (2013.01); *G06Q 10/10* (2013.01); *G06K 2209/01* (2013.01)

(56) References Cited

U.S. PATENT DOCUMENTS

| | | |
|---|---|---|
| 8,542,206 B2 | 9/2013 | Westerman et al. |
| 2003/0185448 A1 | 10/2003 | Seeger et al. |
| 2010/0088099 A1 | 4/2010 | Kurzweil et al. |
| 2011/0081083 A1* | 4/2011 | Lee ................... G06K 9/2081 382/182 |
| 2011/0267490 A1* | 11/2011 | Goktekin ........... G06K 9/00463 348/222.1 |
| 2012/0054177 A1 | 3/2012 | Wang et al. |
| 2012/0102401 A1 | 4/2012 | Ijas et al. |
| 2012/0131520 A1* | 5/2012 | Tang ................... G06F 3/04842 715/863 |
| 2012/0163668 A1 | 6/2012 | Englund et al. |
| 2012/0224072 A1 | 9/2012 | Koo et al. |
| 2012/0284673 A1 | 11/2012 | Lamb et al. |
| 2013/0147982 A1* | 6/2013 | Hirayama .......... H04N 5/23212 348/222.1 |
| 2013/0257741 A1 | 10/2013 | Kong |
| 2013/0272609 A1 | 10/2013 | Sun et al. |
| 2013/0275868 A1 | 10/2013 | Haussila et al. |
| 2014/0304281 A1 | 10/2014 | Halpern |

FOREIGN PATENT DOCUMENTS

| | | |
|---|---|---|
| RU | 2454718 C2 | 6/2012 |
| WO | 2011044231 A1 | 4/2011 |
| WO | 2013089662 A1 | 6/2013 |

OTHER PUBLICATIONS

International Preliminary Report on Patentability from PCT/IB2014/066481, Oct. 30, 2015, Nirav G. Patel.
English abstract of RU2454718 retrieved from Espacenet on Jun. 1, 2016.
INTSIG Information Co.,Ltd, CamCard Free—Business card scanner & Business card reader & scan card, https://itunes.apple.com/ca/app/camcard-free-business-card/id355472887?mt=8, retrieved on Jul. 6, 2016.
Jung, Touch TT: Scene Text Extractor Using Touchscreen Interface, ETRI Journal, vol. 33, No. 1, Feb. 2011, pp. 78-88.

\* cited by examiner

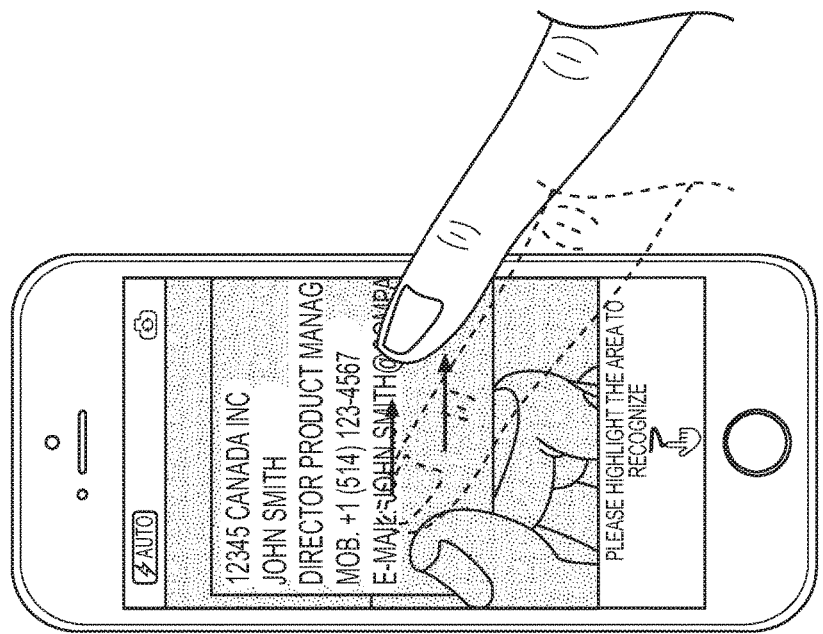
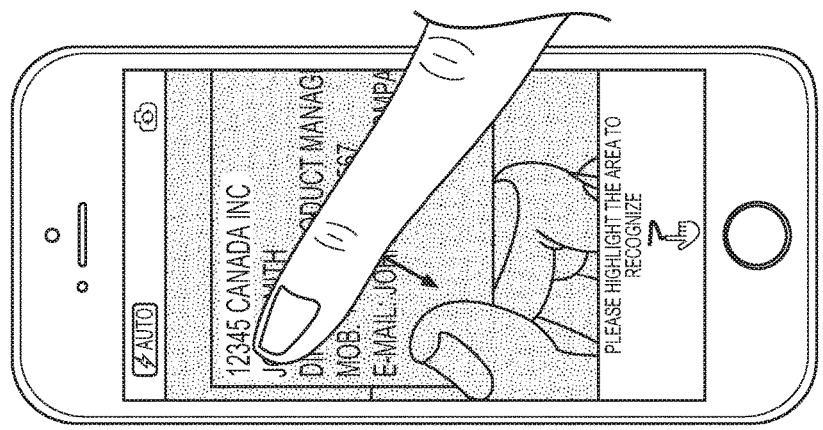

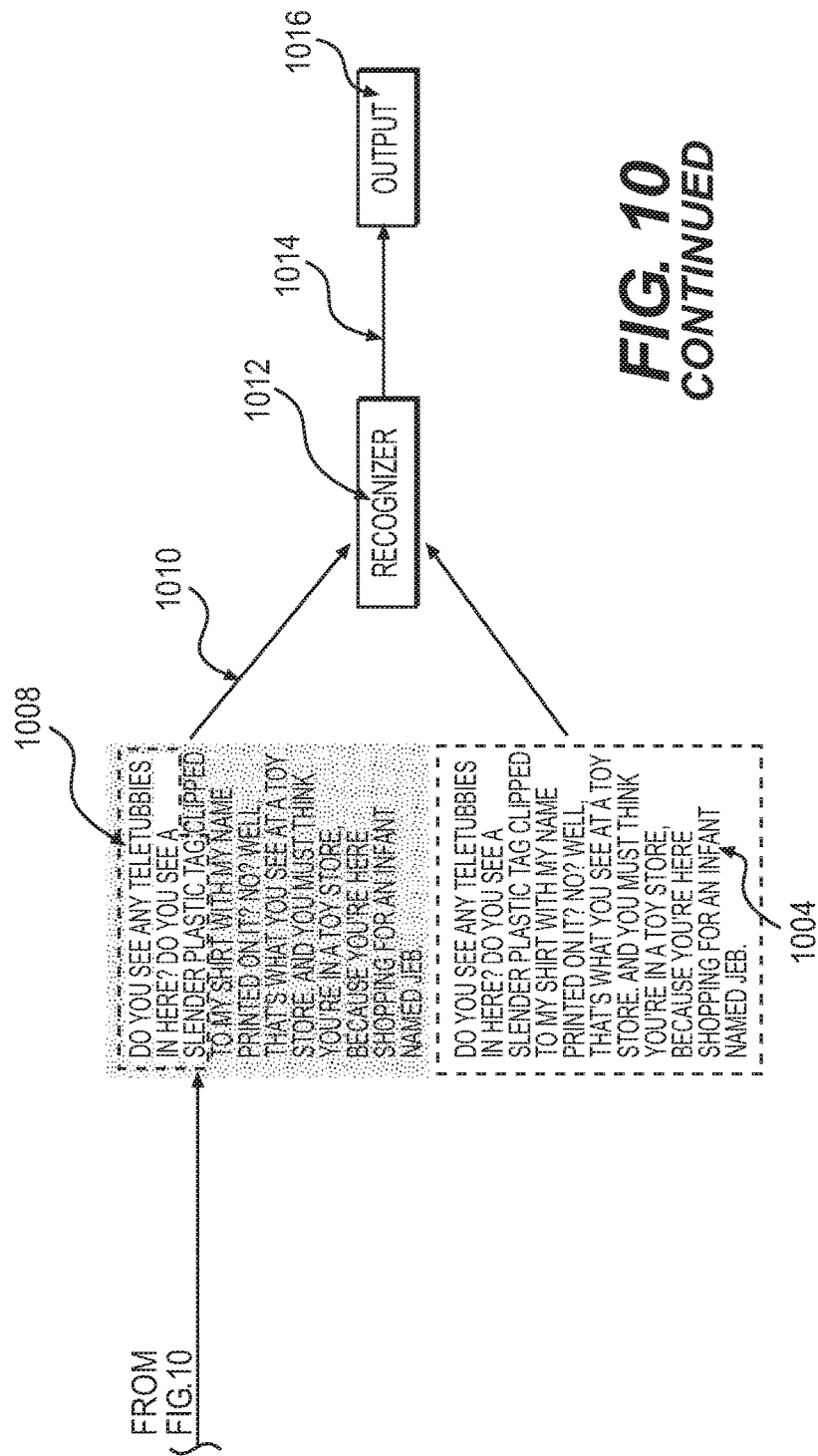

METHOD OF PROCESSING A VISUAL OBJECT

CROSS-REFERENCE

The present application claims convention priority to Russian Patent Application No. 2014122127, filed May 29, 2014, entitled "METHOD OF PROCESSING A VISUAL OBJECT" which is incorporated by reference herein in its entirety.

FIELD

The present technology relates to a method of processing a visual object.

BACKGROUND

Most electronic devices are capable of working with visual objects. Among these devices are image scanners which digitize a two-dimensional image, smartphones which can capture images using built-in cameras, barcode readers which read the data encoded in a barcode, business card scanners and business card readers, and others. Some of these device can convert received data into other formats, and process the data.

Some electronic devices have CamCard application by IntSig Information Co., Ltd, can read business cards and save them to their contacts databases. They sync all cards across smartphones, tablets, computers and the web app of a user. CamCard can be used on iPhone 3GS, iPhone 4, iPhone 4S, iPhone 5, iPhone 5s, iPhone 5c, iPod Touch 5, iPad (Retina), iPad mini Smartphone, having installed CamCard application, can capture a business card by a built-in camera, recognize elements of the whole business card, process the data, store the data into memory. CamCard application is intended to work with a single card each time. If a part of a second business card is captured, it can affect the recognition. Other objects than a business card is not intended to be recognized.

Some electronic devices having installed the software Snap to Text by RTC Hubs Limited, can convert hard copy documents to soft copy text, such as PDF files. Using an electronic device having installed and run Snap to Text by RTC Hubs Limited, a user can extract text from an image and convert it into an editable text document, make categories of the saved items and save pages in the categories, extract text from various image sources like receipts, travel cards, books, agreement etc., share as a text or PDF using Wi-Fi transfer & Dropbox or email, make her own tags to save the text files.

Electronic devices known in the art work with whole images taken by a camera or received in another way, or with parts of images selected by a user.

SUMMARY

It is an object of the present technology to ameliorate at least some of the inconveniences present in the prior art.

According to a first broad aspect of the present technology, there is provided a computer-implemented method. The method is executable on an electronic device, the electronic device having a display screen. The method comprises: displaying an image on the display screen; receiving a user selection of a first portion of the image; responsive to the user selection of the first portion of the image, the first portion of the image containing a selected text portion, performing text recognition of the selected text portion and of an unselected text portion, the unselected text portion located in a second portion of the image being distinct from the first portion of the image, to render a recognized text element.

In some implementations of the present technology, the method is executed on an electronic device which has a camera, the method comprises, prior to the displaying the image on the display screen, capturing the image using the camera.

In some implementations of the present technology displaying the image on the display screen comprises displaying a blurred version of the image.

In some implementations of the present technology, the display screen is a touch screen, and receiving the user selection of the first portion of the image is effected by identifying a touch action performed by the user on the display screen. The display screen can be dual touch displays, multi-touch displays, touchpads or any other touch screen that can identify the presence, location and movement of a touch input.

In some implementations of the present technology, the touch action performed by the user on the display screen is sweeping a portion of the blurred version of the image, the portion of the blurred version of the image corresponding to the first portion of the image.

In some implementations of the present technology, the portion of the blurred version of the image corresponding to the first portion of the image becomes not-blurred after the sweeping.

In some implementations of the present technology, the touch action performed by the user on the display screen is sweeping a portion of a black and white version of the image, the portion of the black and white version of the image corresponding to the first portion of the image.

In some implementations of the present technology, the portion of the black and white version of the image corresponding to the first portion of the image becomes color version after the sweeping.

In some implementations of the present technology, the touch action performed by the user on the display screen is sweeping a portion of the image, the portion of the image corresponding to the first portion of the image.

In some implementations of the present technology, the portion of the image corresponding to the first portion of the image becomes highlighted after the sweeping.

In some implementations of the present technology, before and after the sweeping, the first portion of the image can have other distinctive features than blurred and not blurred version, or black and white and color version.

In some implementations of the present technology, the second portion of the image is immediately adjacent to the first portion of the image.

In some implementations of the present technology, the method further comprises detecting at least one of a logical continuation and a logical extension of the unselected text portion relative to the selected text portion. In some implementations of the present technology, the detecting of at least one of the logical continuation and the logical extension comprises: performing text recognition of an entirety of the text contained within the image to render an entirety of recognized text; and analyzing the entirety of recognized text to determine if the entirety of recognized text potentially contains the unselected text portion.

In some implementations of the present technology, the analyzing further comprises choosing the unselected text portion based on the unselected text portion being the logical continuation of the selected text portion.

In some implementations of the present technology, the method further comprises choosing the unselected text portion based on the unselected text portion being the logical extension of the selected text portion.

In some implementations of the present technology, the selected text portion includes a first selected text portion and a second selected text portion, the unselected text portion includes a first unselected text portion and a second unselected text portion, the method further comprises choosing the first unselected text portion based on the first unselected text portion being one of the logical continuation and the logical extension of the first selected text portion, and choosing the second unselected text portion based on the second unselected text portion being one of the logical continuation and the logical extension of the second selected text portion.

In some implementations of the present technology, the method further comprises displaying at least a portion of the recognized text element.

In some implementations of the present technology, the method further comprises defining a category of the at least a portion of the recognized text element.

In some implementations of the present technology, the method further comprises displaying suggestion to perform an action with regard to the at least a portion of the recognized text element.

In some implementations of the present technology, suggestion to perform the action with regard to the at least a portion of the recognized text element is dependant on the category of the at least a portion of the recognized text element.

In some implementations of the present technology, the method further comprises performing the action with regard to the at least a portion of the recognized text element.

In some implementations of the present technology, the performing the action is executed in response to user confirmation to perform the action with regard to the at least a portion of the recognized text element.

In some implementations of the present technology, performing the action with regard to the at least a portion of the recognized text element comprises at least one: entering at least a portion of the recognized text element into calendar, or entering the at least a portion of the recognized text element into contacts database, or showing an address on a map, or creating an itinerary to a destination, or saving the at least a portion of the recognized text element.

In some implementations of the present technology, the method further comprises storing the first portion of the image and the second portion of the image in association with the recognized text element.

In some implementations of the present technology, the method further comprises storing the image and both the first portion of the image and the second portion of the image, in association with the recognized text element.

In some implementations of the present technology, the method further comprises indexing the recognized text element, or the image, or the first portion of the image and the second portion of the image, or the at least a portion of the recognized text element, or combination of some of them or all of them, and storing a derived index.

According to a second broad aspect of the present technology, there is provided an electronic device. The electronic device comprises a display screen. The electronic device comprises a processor coupled to the display screen, the processor being configured to have access to computer readable commands which commands, when executed, cause the processor to: display an image on the display screen; receive a user selection of a first portion of the image; responsive to the user selection of the first portion of the image, the first portion of the image containing a selected text portion, perform text recognition of the selected text portion and of an unselected text portion, the unselected text portion located in a second portion of the image being distinct from the first portion of the image, to render a recognized text element.

In some implementations, the electronic device further comprises a camera operatively coupled to the processor, wherein computer readable commands, when executed, further cause the processor to capture the image using the camera prior to the image being displayed on the display screen.

In some implementations, the electronic device, wherein to display the image on the display screen, the computer readable commands cause the processor to display a blurred version of the image.

In some implementations, the display screen being a touch screen, computer readable commands, when executed, further cause the processor to receive the user selection of the first portion of the image by identifying a touch action performed by the user on the touch screen. The display screen can be dual touch displays, multi-touch displays, touchpads or any other touch screen that can identify the presence, location and movement of a touch input.

In some implementations, the touch action performed by the user on the touch screen is sweeping a portion of the blurred version of the image, the portion of the blurred version of the image corresponding to the first portion of the image.

In some implementations, the portion of the blurred version of the image corresponding to the first portion of the image becomes not-blurred after the sweeping.

In some implementations, the touch action performed by the user on the display screen is sweeping a portion of a black and white version of the image, the portion of the black and white version of the image corresponding to the first portion of the image.

In some implementations, the portion of the black and white version of the image corresponding to the first portion of the image becomes color version after the sweeping.

In some implementations, the touch action performed by the user on the display screen is sweeping a portion of the image, the portion of the image corresponding to the first portion of the image.

In some implementations, the portion of the image corresponding to the first portion of the image becomes highlighted after the sweeping.

In some implementations, before and after the sweeping, the first portion of the image can have other distinctive features than blurred and not blurred version, or black and white and color version.

In some implementations, the second portion of the image is immediately adjacent to the first portion of the image.

In some implementations, computer readable commands, when executed, further cause the processor to perform text recognition.

In some implementations, computer readable commands, when executed, further cause the processor to detect at least one of a logical continuation and a logical extension of the unselected text portion relative to the selected text portion.

In some implementations, to detect of at least one of the logical continuation and the logical extension, the commands, when executed, further cause the processor to:

perform text recognition of an entirety of the text contained within the image to render an entirety of recognized text; and analyze the entirety of recognized text to determine if the entirety of recognized text potentially contains the unselected text portion.

In some implementations, computer readable commands, when executed, cause the processor to choose the unselected text portion based on the unselected text portion being the logical continuation of the selected text portion.

In some implementations, In some implementations, computer readable commands, when executed, cause the processor to execute choosing the unselected text portion based on the unselected text portion being the logical extension of the selected text portion.

In some implementations, the selected text portion includes a first selected text portion and a second selected text portion, the unselected text portion includes a first unselected text portion and a second unselected text portion, wherein computer readable commands, when executed, further cause the processor to choose: the first unselected text portion based on the first unselected text portion being one of the logical continuation and the logical extension of at least one of the first selected text portion and the second selected text portion, and the second unselected text portion based on the second unselected text portion being one of the logical continuation and the logical extension of at least one of the first selected text portion and the second selected text portion.

In some implementations, computer readable commands, when executed, further cause the processor to display at least a portion of the recognized text element.

In some implementations, computer readable commands, when executed, cause the processor to define a category of the at least a portion of the recognized text element.

In some implementations, computer readable commands, when executed, further cause the processor to display suggestion to perform an action with regard to the at least a portion of the recognized text element.

In some implementations, suggestion to perform the action with regard to the at least a portion of the recognized text element is dependant on the category of the at least a portion of the recognized text element.

In some implementations, computer readable commands, when executed, cause the processor to execute performing the action with regard to the at least a portion of the recognized text element.

In some implementations, the performing the action is executed in response to user confirmation to perform the action with regard to the at least a portion of the recognized text element.

In some implementations, computer readable commands, when executed, further cause the processor to perform the action with regard to at least a portion of the recognized text element in response to user confirmation to perform the action with regard to the at least a portion of the recognized text element.

In some implementations, wherein computer readable commands, when executed, cause the processor to perform the action with regard to at least a portion of the recognized text element, and the action with regard to the at least a portion of the recognized text element comprises at least one: entering the at least a portion of the recognized text element into calendar; entering the at least a portion of the recognized text element into contacts database; showing an address on a map; creating an itinerary to a destination; saving the at least a portion of the recognized text element.

In some implementations, computer readable commands, when executed, further cause the processor to store the first portion of the image and the second portion of the image in association with the recognized text element.

In some implementations, computer readable commands, when executed, further cause the processor to store the image and both the first portion of the image and the second portion of the image, in association with the recognized text element.

In some implementations, computer readable commands, when executed, further cause the processor to index at least one of: the recognized text element, the image, the first portion of the image and the second portion of the image, the at least a portion of the recognized text element, and to store a derived index.

In the context of the present specification, a "server" is a computer program that is running on appropriate hardware and is capable of receiving requests (e.g. from client devices) over a network, and carrying out those requests, or causing those requests to be carried out. The hardware can be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices can be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For better understanding of the present technology, as well as other aspects and further features thereof, reference is made to the following description which is to be used in conjunction with the accompanying drawings, where:

FIG. 3 to FIG. 8 depicts the electronic device 102 during consecutive phases of execution of the computer-implemented method executed in accordance with embodiments of the present technology.

DETAILED DESCRIPTION

Figure 1A:
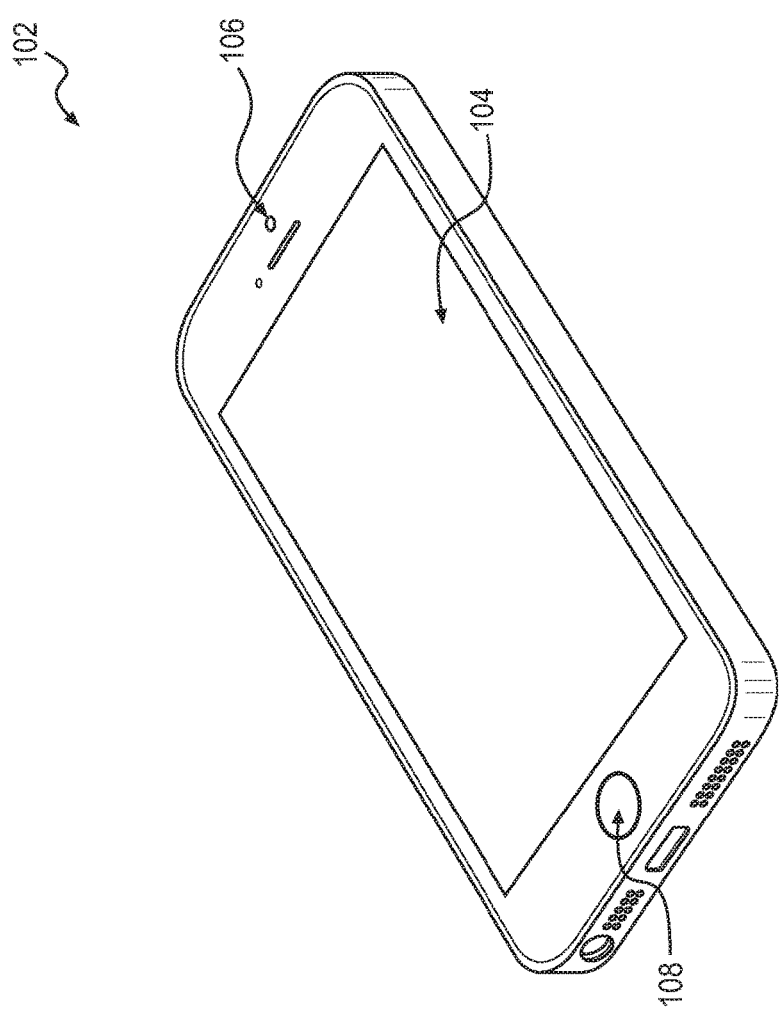
FIG. 1A represents a first perspective view of an electronic device 102, the electronic device being in this implementation Apple iPhone 5s.

FIG. 1A represents a first perspective view of an electronic device 102, the electronic device being in this implementation an Apple iPhone 5s electronic device. In other implementations, the electronic device 102 can be another type of an electronic device. Within various embodiments, the electronic device 102 can be implemented as Samsung Galaxy S5 Smartphone, Apple iPhone 5c 32 GB, Asus 10.1" 32 GB Transformer Book T100 Windows 8.1 Tablet With Wi-Fi, Samsung Galaxy Tab 3 8.0 16 GB Android 4.2 Tablet with Exynos 4212 Processor, HP Envy 17" TouchSmart Laptop—Intel Core i7 4700MQ/1 TB HDD/16 GB RAM running operational system Windows 8.1. Irrespective of the type of the electronic device 102, the electronic device 102 comprises a built-in or an external camera.

More specifically, FIG. 1A represents the front perspective view of the Apple iPhone 5s electronic device. As a non-limiting example, the electronic device 102 can be a laptop computer or a desktop computer.

In this particular implementation, as shown in FIG. 1A, the electronic device 102 comprises a multi-touch display 104. The multi-touch display 104 is 1044-inch (diagonal) Retina display 1136-by-640 resolution 326 ppi, as an example.

The multi-touch display 104 can be used for displaying information, including displaying a graphical user interface. Amongst other things, the multi-touch display 104 can display images captured by the electronic device 102 using a FaceTime camera 106 or an iSight camera 110.

Figure 3:
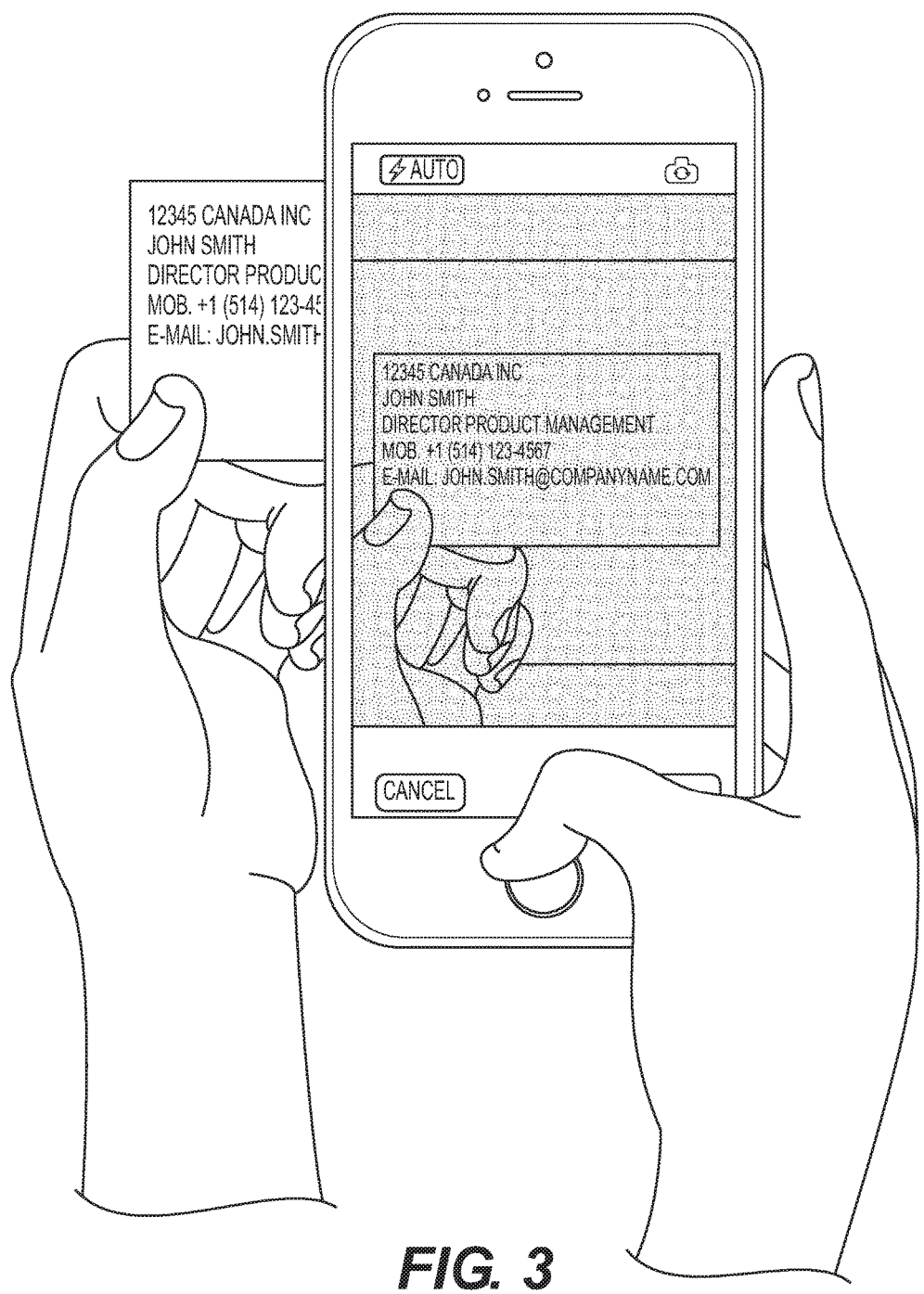

The multi-touch display 104 can display various versions of images. As a non-limiting example and within embodiments of the present technology, the multi-touch display 104 can display a blurred version of the image as it is shown in FIG. 3. The image can be blurred by the electronic device 102 by using of any conventional method, for example by using a Gaussian function.

However, the multi-touch display 104 can alternatively display other versions of images, for example black and white versions.

The multi-touch display 104 can also be used for receiving user input.

The multi-touch display 104 in FIG allows two or more fingers to be used on the screen at a time. The multi-touch display 104 allows pinching and stretching gestures on the screen to control zooming. For example, pinching and stretching gestures on the screen can be used for moving and zooming an image, and for selecting a portion of the image by swiping or by doing other gestures.

The electronic device 102 further comprises the above mentioned FaceTime camera 106. The FaceTime camera 106 can capture 1.2MP photos (1280 by 960) and can record 720p HD video. The FaceTime camera 106 is a part of a camera module 210 shown in FIG. 2, which is connected with processor 202 shown in FIG. 2. The FaceTime camera 106 can be used for capturing images. As a non-limiting example, the FaceTime camera 106 can be used for capturing images containing text. Images can be stored in digital format on one or more storage media being a part of the memory module 204 shown in FIG. 2.

Figure 2:
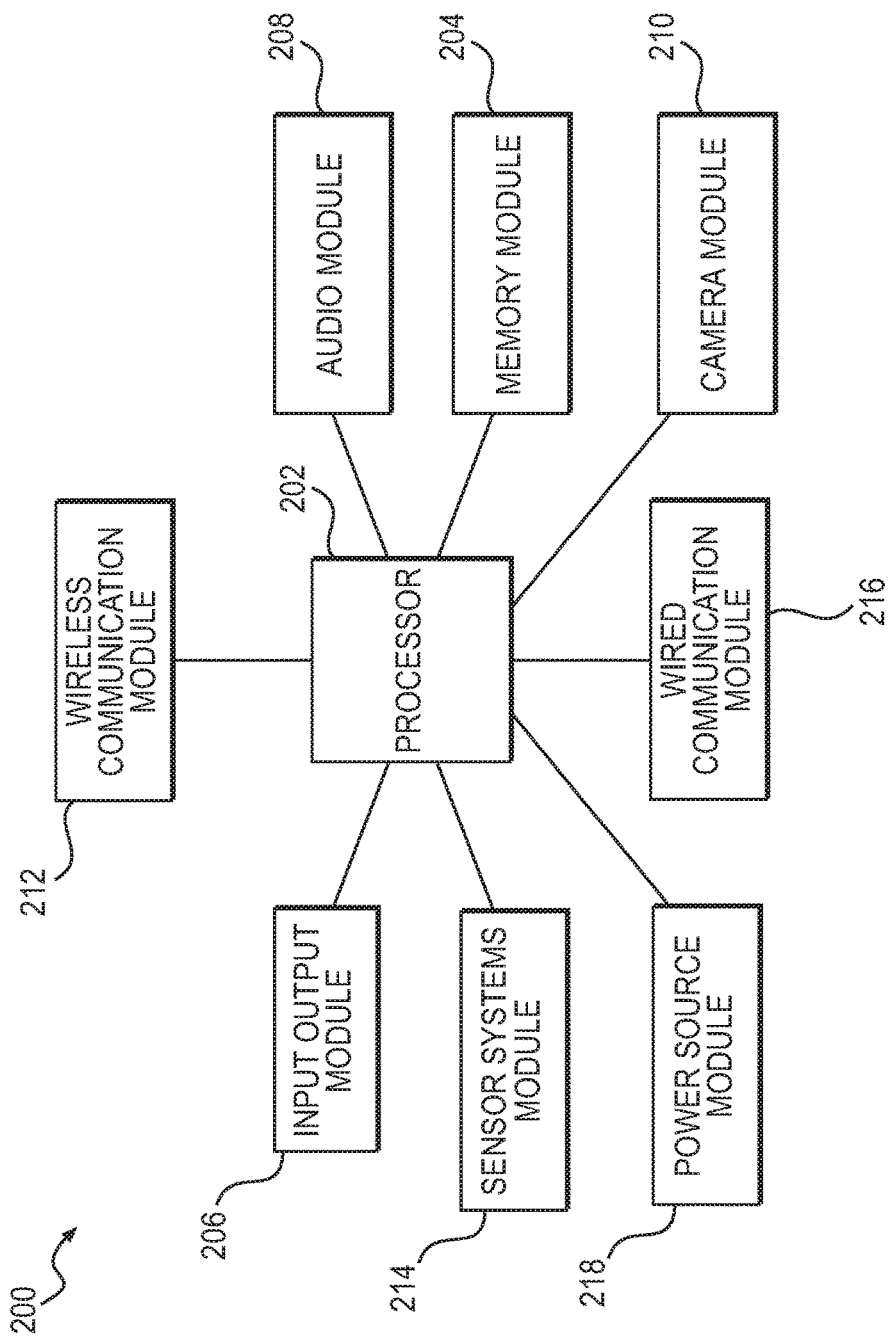
FIG. 2 shows a schematic diagram of the electronic device 102.

The electronic device 102 further comprises a home button/touch ID sensor 108 being a part of the input output module 206 shown in FIG. 2. Home button/touch ID sensor 108 can be used for receiving the user input.

Figure 1B:
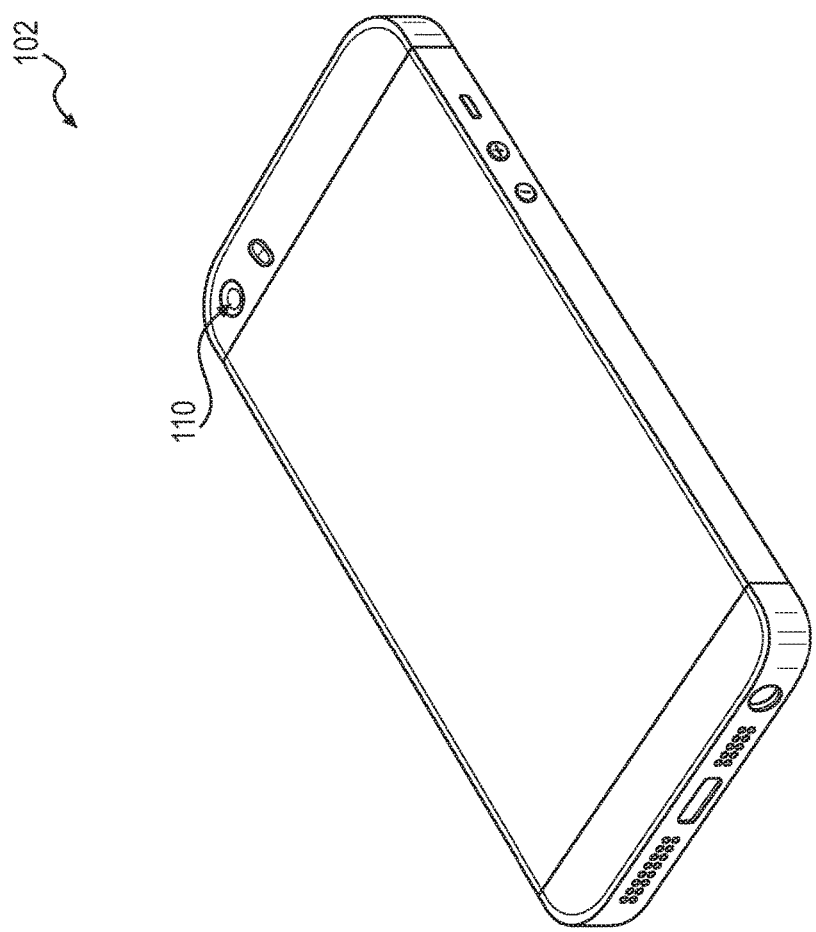
FIG. 1B represents a second perspective view of an electronic device 102, the electronic device being in this implementation Apple iPhone 5s.

FIG. 1B represents the second view of the electronic device 102. More specific, FIG. 1B represents the back perspective view of the Apple iPhone 5s.

In one implementation of the electronic device 102, as shown in FIG. 1B, the electronic device 102 comprises the above-mentioned iSight camera 110. The iSight camera 110 is 8 megapixels camera with 1.5μ pixels f/2.2 aperture. The iSight camera 110 can comprise sapphire crystal lens cover, true tone flash, backside illumination sensor, five-element lens, hybrid IR filter, autofocus, tap to focus, face detection, panorama, auto image stabilization, burst mode, photo geotagging.

The iSight camera 110 is a part of a camera module 210 shown in FIG. 2, which is connected with processor 202 shown in FIG. 2. The iSight camera 110 can also be used for capturing images. As a non-limiting example, iSight camera 110 can be used for capturing images containing text. Images can be stored in digital format on one or more storage media being a part of the memory module 204 shown in FIG. 2.

FIG. 2 depicts a schematic diagram 200 of the electronic device 102. The electronic device 102 can comprise a processor 202. In particular embodiments, the processor 202 can comprise one or more processors and/or one or more microcontrollers configured to execute instructions and to carry out operations associated with the operation of the electronic device 102. In various embodiments, processor 202 can be implemented as a single-chip, multiple chips and/or other electrical components including one or more integrated circuits and printed circuit boards. Processor 202 can optionally contain a cache memory unit (not depicted) for temporary local storage of instructions, data, or computer addresses. By way of example, the processor 202 can include one or more processors or one or more controllers dedicated for certain processing tasks of the electronic device 102 or a single multi-functional processor or controller.

The processor 202 is operatively coupled to a memory module 204. Memory module 204 can encompass one or more storage media and generally provide a place to store computer code (e.g., software and/or firmware) or user data (e.g., photos, text data, indexes etc.). By way of example, the memory module 204 can include various tangible computer-readable storage media including Read-Only Memory (ROM) and/or Random-Access Memory (RAM). As is well known in the art, ROM acts to transfer data and instructions uni-directionally to the processor 202, and RAM is used typically to transfer data and instructions in a bi-directional manner Memory module 204 can also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to the processor 202. Information can also reside on one or more removable storage media loaded into or installed in the electronic device 102 when needed. By way of example, any of a number of suitable memory cards (e.g., SD cards) can be loaded into the electronic device 102 on a temporary or permanent basis.

The memory module 204 can store inter alia a series of computer-readable instructions, which instructions when executed cause the processor 202 (as well as other components of the electronic device 102) to execute the various operations described herein.

The electronic device 102 further comprises an input output module 206. Input output module 206 can comprise one or more input and output devices operably connected to processor 202.

For example, in one implementation of the electronic device 102, as shown in FIG. 1B, input output module 206 of the electronic device 102 comprises the multi-touch display 104 being in this implementation 1044-inch (diagonal) Retina display 1136-by-640 resolution 326 ppi, and home button/touch ID sensor 108.

In other implementations, input output module 206 can further or alternatively comprise keyboard, mouse, one or more buttons, thumb wheel, and/or display (e.g., liquid crystal display (LCD), light emitting diode (LED), Interferometric modulator display (IMOD), or any other suitable display technology). Generally, input devices are configured to transfer data, commands and responses from the outside world into electronic device 102. The display is generally configured to display a graphical user interface (GUI) that provides an easy to use visual interface between a user of the electronic device 102 and the operating system or application(s) running on the electronic device 102. Generally, the GUI presents programs, files and operational options with graphical images. During operation, the user can select and activate various graphical images displayed on the display in order to initiate functions and tasks associated therewith. Input output module 206 can also include touch based devices such as touchpad and touch screen. A touchpad is an input device including a surface that detects touch-based inputs of users. Similarly, a touch screen is a display that detects the presence and location of user touch inputs. Input output module 206 can also include dual touch or multi-touch displays or touchpads that can identify the presence, location and movement of a touch inputs.

In the particular embodiments of the electronic device 102, the input output module 206 can comprise the multi-touch display 104.

In particular embodiments, electronic device 102 can additionally comprise an audio module 208, a camera module 210, a wireless communication module 212, sensor modules 214, and/or wired communication module 216, all operably connected to the processor 202 to facilitate various functions of electronic device 102. The camera module 210 can comprise one or more cameras. In one of the implementations of the present technology, the camera module 210 comprises the FaceTime camera 106 and the iSight camera 110.

The camera module 208 can include an optical sensor (e.g., a charged coupled device (CCD), or a complementary metal-oxide semiconductor (CMOS) image sensor), which can be utilized to facilitate functions of the FaceTime camera 106 or of the iSight camera 110, such as recording photographs and video clips.

The wired communication module 216 can include a Universal Serial Bus (USB) port for file transferring, or a Ethernet port for connection to a local area network (LAN). Additionally, electronic device 102 can be powered by a power source module 218, which can be executed as rechargeable batter or the like.

Wireless communication module 212 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication module 212 can include hosting protocols such that electronic device 102 can be configured as a base station for other wireless devices.

Sensor module 214 can include one or more sensor devices to provide additional input and facilitate multiple functionalities of the electronic device 102.

In particular embodiments, various components of electronic device 102 can be operably connected together by one or more buses (including hardware and/or software). As an example and not by way of limitation, the one or more buses can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I2C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

FIG. 3 to FIG. 8 depict the electronic device 102 during consecutive phases of execution of the computer-implemented method implemented in accordance with non-limiting embodiments of the present technology, the method is executable on the electronic device 102.

FIG. 3 depicts the electronic device 102 when the user uses the electronic device 102. The electronic device 102 is in the hand of the user, the user being in the process of capturing image of a business card using the iSight camera 110.

In this particular implementation, capturing the image is effected by using the iSight camera 110. However, in alternative implementations, the image can be captured by any conventional built-in or external digital camera. In other implementations, the image shall not necessarily be captured by the camera built-in to the electronic device 102 or connected to the electronic device 102. Instead, prior to displaying the image on the display screen, the image can be downloaded from the Internet, or received from a scanner, or received from any other source.

The captured image can be stored in any digital format. For example, the image can be in JPG, GIF, TIF and other formats.

In this particular implementation, the method comprises storing the image in a digital format on a storage media, the storage media being a part of the memory module 204 shown in FIG. 2.

The method comprises displaying the image.

In this implementation, the method further comprises displaying the image on the display screen as it shown in FIG. 3, the display screen being the multi-touch display 104 shown in FIG. 1A.

As it is shown in FIG. 3, the captured image comprises the business card and a portion of the hand. The portion of the hand is an irrelevant portion of the captured image, is it has no relevance to what the user is intending to capture.

As it is shown in FIG. 3, the image displayed on multi-touch display 104 is a blurred version of the image. The image can be blurred by the electronic device 102 by using of any conventional method, for example by using a Gaussian function.

In other implementations of the present technology, any other version of the image can be displayed: a black and white version of the image, a color version of the image, and others.

The image can contain a text, as it is shown in FIG. 3. As a non-limiting example, the text can comprise letters, digits, special charters, and their combinations. If the image contains no text, there is the end of method.

Letters can be Latin, Cyrillic and others. Digits can be Arabic numerals, Roman numerals, and others.

The image can contain other objects than the text. For example, as it is shown in FIG. 3, the image contains a fragment of the user hand and borders of the business card.

The method further comprises receiving a user selection of at least a portion of the text the user is desirous of having text-recognized. Hence, by executing the user selection of the at least the portion of the text, the user select the portion of the text the user is desirous of being text-recognized.

FIGS. 4A, 4B, 5A, and 5B illustrate the user selection process of the at least the portion of the text contained in the captured image.

The user selection is the selection of a portion of the image. This selected portion of the image will be called a first portion of the image.

Figure 4B:
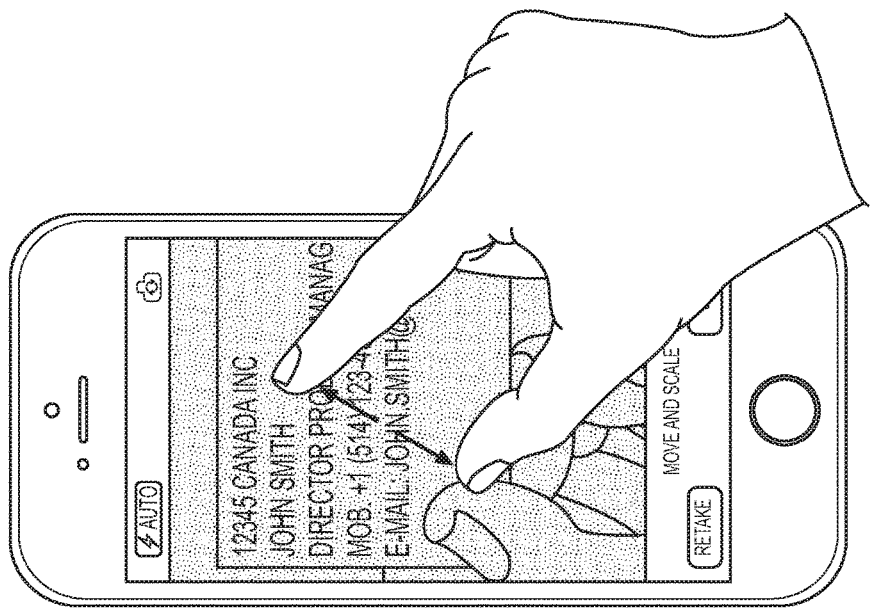
Figure 4A:
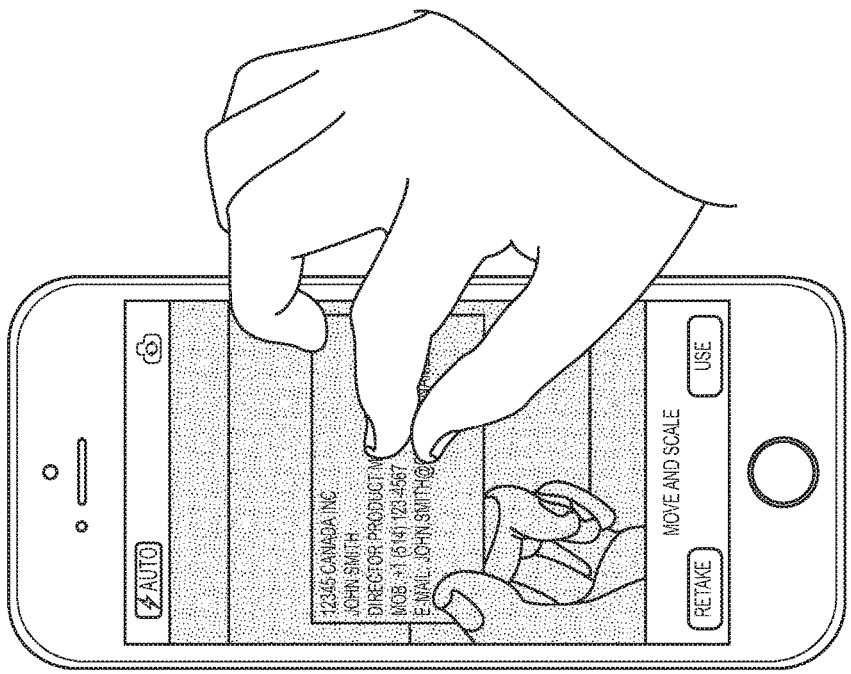

To select the first portion of the image, as it is shown in FIG. 4A, the user may need to change the view of the image. For example, the user can move the image by touching the multi-touch display 104 and dragging the image to zoom in onto the portion of the image that the user is interested in.

Then, as it is shown in FIG. 4B, the user may need to zoom in the image to make an image on the screen larger to better view a portion of the image and to facilitate further selection of the portion of the image. The user touch two points on the multi-touch display 104 displaying the image, and then move her fingers away from each other, as if she is stretching them apart (or vice versa, if the user needs to zoom out the image).

FIG. 5A and FIG. 5B demonstrate continuation of the touch action performed by the user on the display screen.

The touch action illustrated in FIG. 5A and in FIG. 5B is a user-action of sweeping a portion of the blurred version of the image, the portion of the blurred version of the image corresponding to the first portion of the image. By touch action, the user selects the area that contains a text that the user wants to have text recognized. When doing so, the user may be inaccurate and may have failed to select the whole text he wants to have recognized. One of reasons of inaccuracy can be that the user zoomed in too much, as it is shown in FIG. 5A and in FIG. 5B, where a part of the text being on the business card is not more displayed in its entirety.

After the user has executed the sweeping action, the portion of the blurred version of the image corresponding to the first portion of the image becomes non-blurred. This change of the portion of the image visualizes the user selection to the user. The visualization permits to the user to understand if he has to continue the process of selection or if he has already selected the portion of the image he wants to have recognized.

In other implementations of the present technology, where the image being displayed to the user is a black and white version of the image, the touch action performed by the user on the display screen is a sweeping action of a portion of a black and white version of the image, the portion of the black and white version of the image corresponding to the first portion of the image. In these implementations, the portion of the black and white version of the image corresponding to the first portion of the image can be transformed to a color version after the sweeping.

In other implementations of the present technology, the touch action performed by the user on the display screen is sweeping a portion of the image, the portion of the image corresponding to the first portion of the image. In this implementation, the portion of the image corresponding to the first portion of the image becomes highlighted after the sweeping. This change of color visualizes the user selection. The visualization permits to the user to understand if he has to continue the process of selection or if he has already selected the portion of the image he wants to have recognized.

In some implementations of the present technology, before and after the sweeping, the first portion of the image can have other distinctive features than blurred and not blurred version, or black and white and color version.

In other embodiments, the user selection of the first portion of the image can be effected in any other conventional manner, for example, by using a pointing device like a mouse.

Receiving the user selection of the first portion of the image can be effected in any conventional manner dependant on the selection method.

Figure 6:
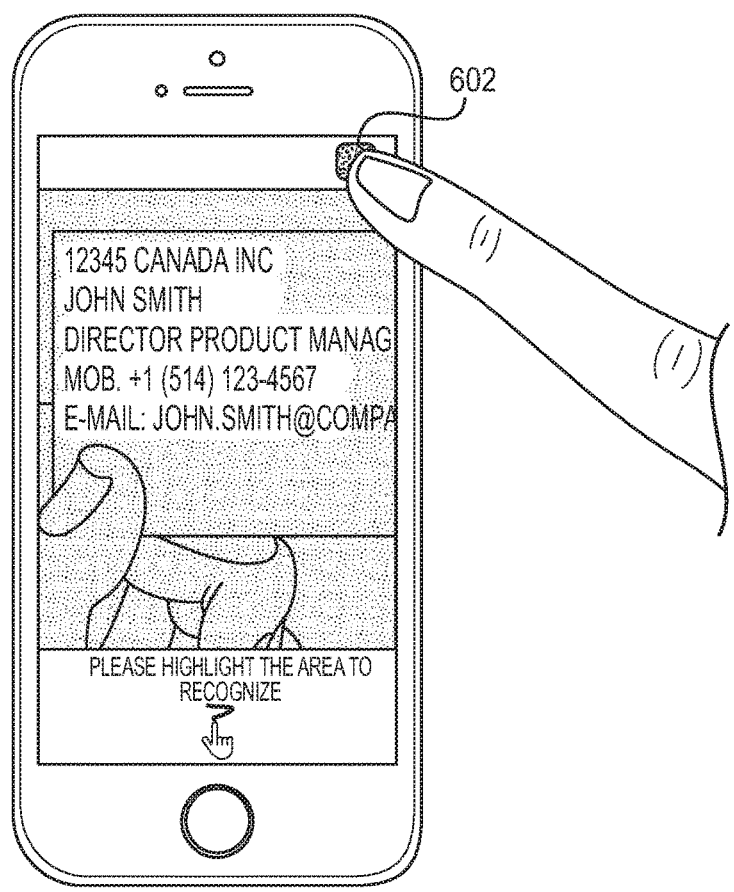

FIG. 6 demonstrates a fragment of blurred version of the image, the fragment displayed on the multi-touch display 104.

The portion of the blurred version of the image, corresponding to the first portion of the image, is non-blurred anymore. The first portion of the image comprises the most of text of the business card. However, a part of an e-mail address is not selected by the user. More specifically, letters "mpany.com" are not selected. Therefore, the image can contain a selected text and an unselected text, the unselected text being any text containing in the image that did not form part (intentionally or otherwise) of the user selection of the selected text.

Within the embodiments of this technology, the portion of the image containing the unselected text portion which is potentially related to the selected text portion can be thought of as a "second portion of the image". Therefore, it can be said that the selected text portion is within the first portion of the image and the unselected text portion is within the second portion of the image.

Within the depicted embodiments, the second portion of the image is immediately adjacent to the first portion of the image. However, this does not need to be so in every embodiment of the present technology. As such the first portion of the image and the second portion of the image can be spaced apart within the image.

Within the example, the letters "mpany.com" can be thought of as a first unselected text portion and the combination of letters and special characters "john.smith@co" can be thought of as a first selected text portion. Naturally, both the selected text portion and the unselected text portions can be split into a plurality of, respectively, of selected text portions and unselected text portions, as will be described herein below.

The user can then press an interactive button "recognize" 602 to perform text recognition. Then, the process of text recognition commences.

Figure 7C:
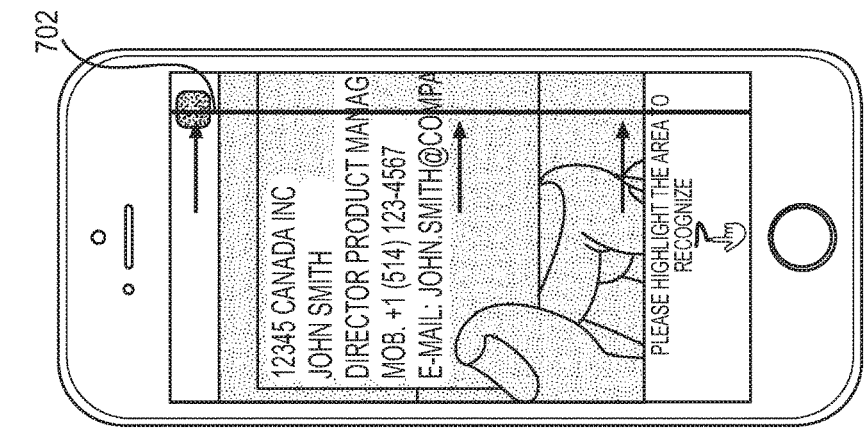
Figure 7B:
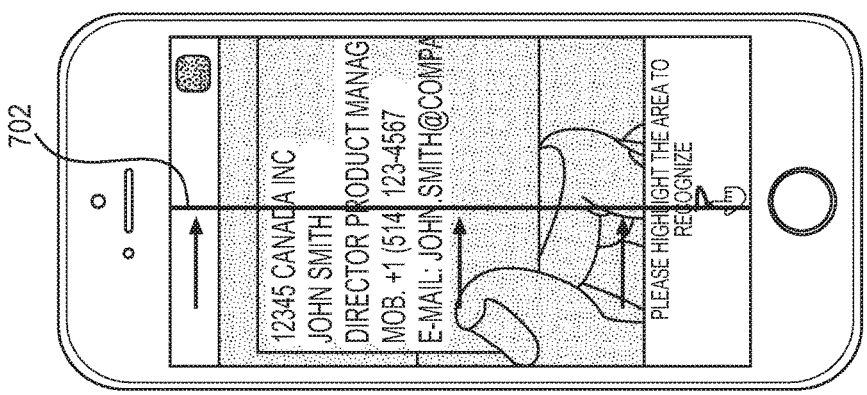
Figure 7A:
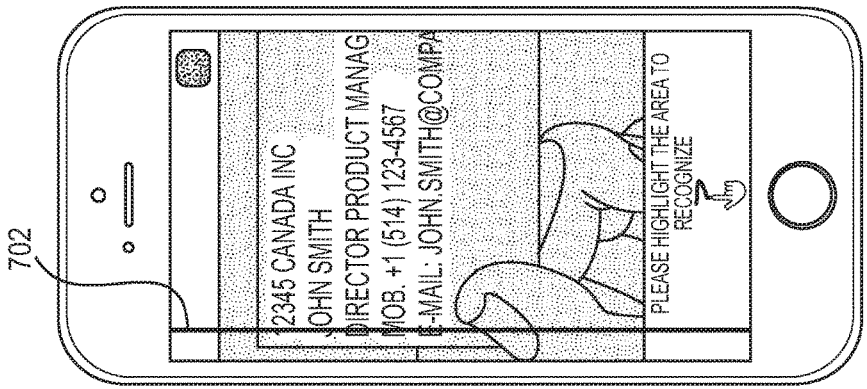

FIG. 7A, FIG. 7B, and FIG. 7C illustrate the multi-touch display 104 after commencement of the process of text recognition. The light line 702 runs from the left side of the multi-touch display 104 to the right side of the multi-touch display 104, imitating the light line of a copy machine. The way how the multi-touch display 104 is presented during the process of text recognition is not important for the present technology. FIG. 7A, FIG. 7B, and FIG. 7C serve to illustrative purposes only and, in alternative embodiments, the multi-touch display 104 may not provide any visual indication of the process of text recognition.

As used herein, "text recognition" is meant to denote text recognition in a broad sense. Accordingly, text recognition can be performed using OCR library which can consist from two parts. The first part of the library can be dedicated to perform the first step, namely the step of detection of the text. The second part of the library can be dedicated to perform the second step, namely the recognition, in the narrow sense of this word, of the detected text. A detection algorithm can form hypotheses where letters of the words are situated, and further combines them into words. In the similar manner, the detection algorithm can form hypotheses where letters, numbers, hieroglyphs, special charters and so on are located, and then combine them into words, phone numbers, e-mail addresses, and so on. Naturally, any other known algorithm for executing text recognition process can be used.

After performing the text recognition, the step of detecting of a logical continuation of the unselected text portion or a logical extension of the unselected text portion relative to the selected text portion comences.

The logical continuation can be said to exist when the selected text portion comprises a fragment of a word, or fragment of an e-mail address, or fragment of a phone number, or fragment of proper name and so on, and the unselected text portion comprises the second part of a word, or of an e-mail address, or of a phone number, or of proper name, and so on. In other words, as part of determining a logical continuation, the electronic device 102 can determine if there exists an unselected portion of the text, which is not a part of the selected text portion, which unselected portion of the text forms a logical continuation of the portion of the selected text.

The logical extension can exist when the selected text portion comprises a fragment of name, or fragment of address, or fragment of contact data and so on, and the unselected text portion comprises a missing fragment of name, or missing fragment of address, or missing fragment of contact data and so on. In other words, as part of determining a logical continuation, the electronic device 102 can determine if there exists an unselected portion of the text, which is not a part of the selected text portion, which unselected portion of the text forms a logical extension of the portion of the selected text.

In some implementations of the present technology, the method further comprises choosing the unselected text portion based on the unselected text portion being the logical continuation of the selected text portion.

For example, if the selected text portion contains "john.smith@", the selected text portion located in the first portion of the image, the first portion of the image selected by the user, then the immediately following text "gmail.com" is the logical continuation of the selected text portion. The text "gmail.com", being the second fragment of an e-mail address, can be in such a case the unselected text portion, the unselected text portion located in the second portion of the image, the second portion of the image not selected by the user. Fragments of e-mail address are not the only possible extensions of the selected text portion. Many other extensions are possible, for example fragments of words, phone numbers, etc.

In some implementations of the present technology, the method further comprises choosing the unselected text portion based on the unselected text portion being the logical extension of the selected text portion.

For example, if the first text portion contains "John Smith, tel. (514) 123-4567", the first text portion located in the first portion of the image, the first portion of the image selected by the user, then the immediately following text "E-mail; john.smith@gmail.com" is the logical extension of the first text portion. The text "E-mail; john.smith@gmail.com", being a portion of contact data of a person, can be in such a case the second text portion, the second text portion located in the second portion of the image, the second portion of the image not selected by the user. Fragments of contact data are not the only possible extensions of the first text portion. Many other extensions are possible, for example job titles can be extensions of names, city names or street names can be extensions of postal codes; the time can be extension of the data (for example, in "May 2, 2014 at 4.41 pm"), etc.

In some implementations of the present technology, the selected text portion includes a first selected text portion and a second selected text portion, the unselected text portion includes a first unselected text portion and a second unselected text portion, the method further comprises choosing the first unselected text portion based on the first unselected text portion being one of the logical continuation and the logical extension of at least one of the first selected text portion and the second selected text portion, and choosing the second unselected text portion based on the second unselected text portion being one of the logical continuation and the logical extension of at least one of the first selected text portion and the second selected text portion. Naturally, any given image can have a plurality of selected text portions and a plurality of the unselected text portions. As such, any given one of the unselected text portions can be chosen based on its being one of the logical extension or logical continuation (or, conceivably both) of at least one of the selected text portions. Therefore, it should become clear that embodiments of the present technology, allow for the electronic device 102 to fill in any gaps or omissions of the user selection of the selected text portion.

For example, this can be in the situation where the user selected the contact data of a person, but by inaccuracy have not selected the last digits of the phone number and the last letters of the e-mail address. The last digits of the phone number can be in this case the first unselected text portion, and the last letters of the e-mail address can be the second unselected text portion. Accordingly, the first digits of the phone number can be in this case the first selected text portion, and the first letters, dots and @ sign of the e-mail address can be the second selected text portion.

The portion of the recognized text element is not always the selected text portion or the unselected text portion. In many cases, the portion of recognized text element does not strictly coincide with the selected text portion or with the unselected text portion. The portion of the recognized element can be a combination of both the selected text portion and the unselected text portion (or portions thereof). In other examples, a portion of the recognized element also can only include one text portion: the selected text portion or the unselected text portion; in such a case, the portion of the recognized element can coincide the respective selected text portion or unselected text portion, or be a portion of the respective selected text portion or unselected text portion.

In yet other examples, some portions of the recognized text element can include one of: the selected text portion or the unselected text portion, while others portions of the recognized text element can include a combination of both the selected text portion and the unselected text portion.

Some portions of the recognized text element can include the entirety of the selected text portion or the entirety of the unselected text portion, as well as a portion of another text portion.

In other words, portions of the recognized element can include any combination of the selected text portion and the unselected text portion or portions thereof.

Detection of portions of the recognized text elements can be executed by means of detection of at least one of: a logical continuation and a logical extension of the unselected text portion relative to the selected text portion. Hence, in some embodiments of the present technology, the method further includes executing a text recognition of an entirety of the text contained within the image and then determining if the entirety of the text potentially contains an unselected text portion that is one of the logical continuation and a logical extension of the selected text portion.

In some implementations of the present technology, the method further comprises defining a category of the at least a portion of the recognized text element. The portion of the recognized text element can be a categorised in any logical unit, such as but not limited to: a name, an e-mail, an address, bank account details, etc. Naturally, the portion of the recognized text can be categorized into nested categories. For example, a given logical unit can be a sub-unit of a larger logical unit. One will appreciate, that a phone number, being in itself a logical unit, can be a sub-unit of an address, the address being a larger logical unit.

Not for the purpose of limiting, but rather for the purposes of illustration, the category of the at least a portion of the recognized text element can be an address, or a contact data, or a location, or a time, or an event, or a ticket, or a note, or a simple text, or combination of two or more of them, or any other portion of the recognized text element being able to have distinctive user-meaningful features.

Figure 10:
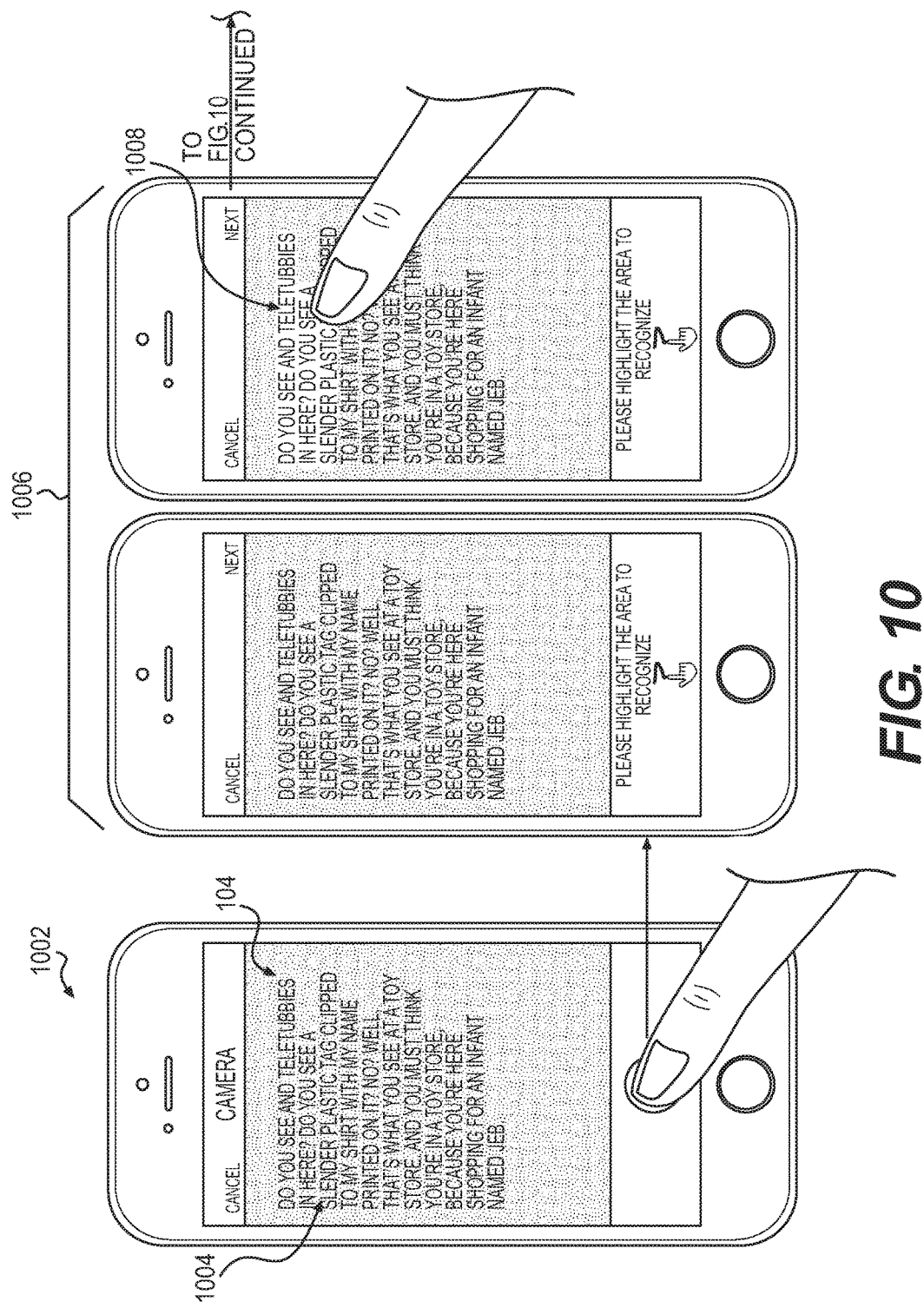
FIG. 10 shows a schematic diagram of the text recognition process that occurs during execution of the computer-implemented method executed according to embodiments of the present technology.

For better understanding, some aspects of recognition process will be now described with reference to FIG. 10. FIG. 10 depicts a schematic diagram of the text recognition process that occurs during execution of the computer-implemented method executed according to embodiments of the present technology. For the purposes of this illustration, it shall be assumed that the user of the electronic device 102 id desirous of capturing an image of a piece of a literary work and to have a portion of the text contained therein to be subjected to a text recognition routine. Naturally, this scenario is only presented herein for illustration purposes and should not be used to limit the scope of the present technology.

At step 1002, the user captures the image 1004 using the iSight camera 110. Display screen displays the image 1004, the display screen being in this implementation the multi-touch display 104. The image 1004 in this implementation is a black and white image representation of the captured image 1004.

At step 1006, the user selects the first portion of the image 1008 by a touch action, the touch action performed by the user on the multi-touch display 104. In the illustrated embodiment, the touch action is sweeping a first portion 1008 of the black and white version of the image 1004, the first portion 1008 representing of the text the user is desirous of having text-recognized. In this implementation, the portion of the image corresponding to the first portion of the image 1008 becomes highlighted after the sweeping.

At step 1010, after the user has touched the interactive button "next" on the display screen (the action is not shown on the FIG. 10), both the image 1004 and the first portion of the image 1008 are sent to a recognizer 1012. The function of recognizer 1012 can be performed by the processor 202.

At step 1006, the recognizer 1012 depicted in FIG. 10 intersects the image 1004 and the first portion of the image 1008 to avoid the missing text elements being representative of the text elements potentially omitted by the user when selecting the portion of the image that the user is desirous of having text-recognized. In some embodiments of the present technology, the recognizer 1012 performs a text recognition routine of the entirety of the text contained within the image, the entirety of the text including the user selected text portion.

Then, at step 1014, the recognizer produces the output 1016, the output 1016 being a representation of the text recognition of the entirety of the text contained in the image, including the representation of the text recognition of the selected text portion. The output 1016 can be further used for choosing the unselected text portion based on the unselected text portion being the logical extension of the selected text portion or logical continuation of the selected text.

Figure 8:
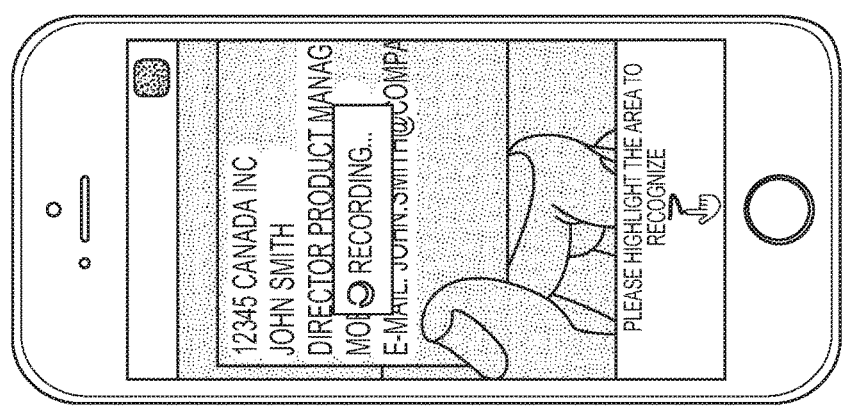

FIG. 8 demonstrates the multi-touch display 104 during the process of defining a category of the at least a portion of the recognized text element and during the process of storing the recognized text element in a memory. The way how the multi-touch display 104 is presented during these processes is not important for the present technology. FIG. 8 serves to illustrative purposes only.

Figure 9:
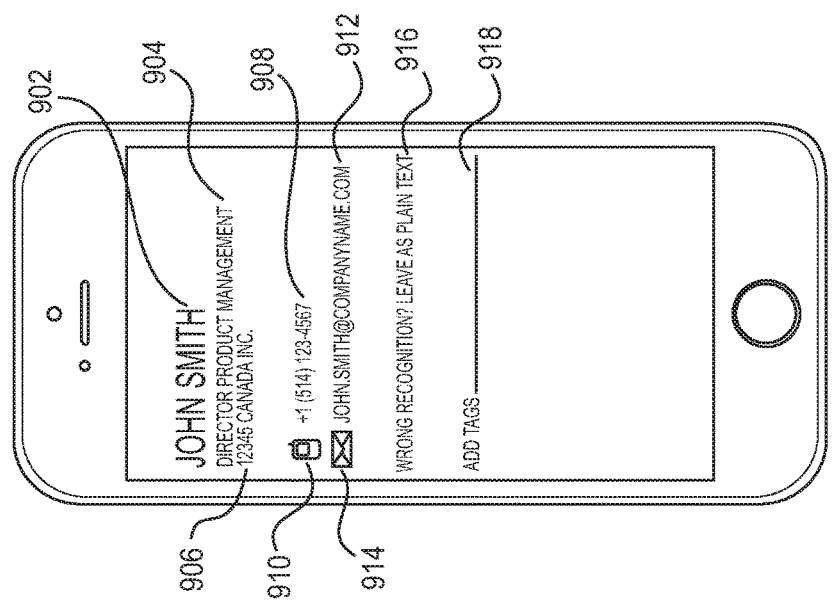
FIG. 9 depicts the electronic device 102 with portions of the recognized text element being displayed in accordance with embodiments of the present technology.

FIG. 9 demonstrates the multi-touch display 104 of the electronic device 102 after completion of the process of detecting of the at least a portion of the recognized text, and after defining a category of the at least a portion of the recognized text element.

As it was described above, in some implementations of the present technology, the method comprises displaying at least a portion of the recognized text element. In some embodiments, the at least a portion of the recognized text element is shown to the user in association with the category assigned to the at least a portion of the recognized text element. Each portion within the recognized text element is displayed in associated with respectively assigned category. FIG. 9 demonstrates portions of the recognized text element being displayed on the multi-touch display 104.

In this implementation, before displaying on the multi-touch display 104, following portions of recognized text element were detected and categorized: the name "John Smith", the job title "Director product management", the company name "12345 Canada Inc.", the phone number "+1 (514) 123-4567", the e-mail "john.smith@companyname.com".

In FIG. 9, following portions of recognized text element are displayed: the name 902 "John Smith", the job title 904 "Director product management", the company name 906 "12345 Canada Inc.", the phone number 908 "+1 (514) 123-4567", along with a fourth category symbol 910, the e-mail 912 "john.smith@companyname.com" along with a fifth category symbol 914. In this example, the first category is names; the second category is job titles; the third category is company names; the fourth category is phone numbers; the fifth category is e-mail addresses.

While only the fourth category symbol 910 and the fifth category symbol 914 are displayed in this example, in other implementations, other categories can be displayed, or no category can be displayed, or all detected categories can be displayed.

In some implementations of the present technology, the method further comprises displaying suggestion to perform an action with regard to the at least a portion of the recognized text element. For example, the method can display to the user a suggestion to save, to correct, or to delete the at least a portion of the recognized text element can be suggested.

In some implementations of the present technology, the suggestion to perform the action with regard to the at least a portion of the recognized text element is dependant on the category of the at least a portion of the recognized text element.

For example, the suggestion to create itinerary to the destination can be displayed for the at least a portion of the recognized text element which category was defined as "location"; the suggestion to make a call can be displayed for the at least a portion of the recognized text element which category was defined as "phone number". Other suggestions for these and other categories are possible.

For example, as it is shown in FIG. 9, following suggestions to perform actions with regard to the at least a portion of the recognized text element are displayed: the suggestion to leave the recognized text as plain text 916, and the suggestion to add tags 918. These suggestions are not specific to a particular category of the at least a portion of the recognized text element. However, in other implementations, suggestion to perform the action with regard to the at least a portion of the recognized text element can be dependant on the category of the at least a portion of the recognized text element. For example, suggestion to make a call to the recognized phone number can be made.

In some implementations of the present technology, the method further comprises performing the action with regard to the at least a portion of the recognized text element. This can be any action which performance is necessary or useful in circumstances and where confirmation of the user is not necessary. For example, it can be automatic saving of the image or of a portion of the image. Whether the confirmation of the user is necessary or not, can be decided by the user himself in the settings of the electronic device. However, some actions can be pre-programmed as actions which shall be performed without asking the user for his confirmation.

In some implementations of the present technology, performing the action is executed in response to user confirmation to perform the action with regard to the at least a portion of the recognized text element.

In some implementations of the present technology, performing the action with regard to the at least a portion of the recognized text element comprises at least one: entering the at least a portion of the recognized text element into calendar, or entering the at least a portion of the recognized text element into contacts database, or showing an address on a map, or creating an itinerary to a destination, or saving the at least a portion of the recognized text element. Other actions are possible. Performing of two or more actions with regard to the at least a portion of the recognized text element is possible, also.

In some implementations of the present technology, the method further comprises storing the first portion of the image and the second portion of the image in association with the recognized text element. Storing can be performed in any conventional manner Storing can be effected on the electronic device 102, or on a remote device (not depicted).

In some implementations of the present technology, the method further comprises storing the image and both the first portion of the image and the second portion of the image, in association with the recognized text element. Storing can be performed in any conventional manner Storing can be effected on the electronic device 102, or on a remote device (not depicted).

In some implementations of the present technology, the method further comprises indexing the recognized text element, or the image, or the first portion of the image and the second portion of the image, or the at least a portion of the recognized text element, or combination of some of them or all of them, and storing a derived index. Indexing can be performed in any conventional manner Storing the derived index can be effected on the electronic device, or on remote device.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What we claim is:

1. A computer-implemented method executed on an electronic device, the electronic device having a display screen, the method comprising:
    displaying an image on the display screen;
    receiving a user selection of a first portion of the image;
    responsive to the user selection of the first portion of the image, the first portion of the image containing a selected text portion, performing text recognition of the selected text portion and of an unselected text portion, the unselected text portion located in a second portion of the image being distinct from the selected text portion located in the first portion of the image, the second portion of the image being immediately adjacent to the first portion of the image;
    after performing the text recognition of the selected text portion and of the unselected text portion, determining if the unselected text portion should form part of a recognized text element, the determining comprises detecting at least one of a logical continuation and a logical extension of the unselected text portion relative to the selected text portion;
    responsive to determining that the unselected text portion should form part of the recognized text element, creating the recognized text element that includes the selected text portion and at least a portion of the unselected text portion;
    the display screen being a touch screen, wherein receiving the user selection of the first portion of the image is effected by identifying a touch action performed by the user on the display screen; and
    wherein the displaying the image on the display screen comprises displaying a blurred version of the image, and wherein the touch action performed by the user on the display screen is sweeping a portion of the blurred version of the image, the portion of the blurred version of the image corresponding to the first portion of the image.

2. The method claim 1, the electronic device comprising a camera, the method further comprising, prior to the displaying the image on the display screen, capturing the image using the camera.

3. The method of claim 1, wherein the displaying the image on the display screen comprises displaying a blurred version of the image.

4. The method of claim 1, wherein said detecting of at least one of the logical continuation and the logical extension comprises:
    performing text recognition of an entirety of the text contained within the image to render an entirety of recognized text;
    analyzing the entirety of recognized text to determine if the entirety of recognized text potentially contains the unselected text portion.

5. The method of claim 4, wherein said analyzing further comprises choosing the unselected text portion based on the unselected text portion being the logical continuation of the selected text portion.

6. The method of claim 4, wherein said analyzing further comprises choosing the unselected text portion based on the unselected text portion being the logical extension of the selected text portion.

7. The method of claim 4, the selected text portion including a first selected text portion and a second selected text portion, the unselected text portion including a first unselected text portion and a second unselected text portion, wherein said analyzing further comprises choosing:
    the first unselected text portion based on the first unselected text portion being one of the logical continuation and the logical extension of at least one of the first selected text portion and the second selected text portion, and
    the second unselected text portion based on the second unselected text portion being one of the logical continuation and the logical extension of at least one of the first selected text portion and the second selected text portion.

8. The method of claim 1, further comprising displaying at least a portion of the recognized text element.

9. The method of claim 1, further comprising defining a category of the at least a portion of the recognized text element.

10. The method of claim 8, further comprising displaying suggestion to perform an action with regard to the at least a portion of the recognized text element.

11. The method of claim 10, wherein suggestion to perform the action with regard to the at least a portion of the recognized text element is selected based on the category of the at least a portion of the recognized text element.

12. The method of claim 10, further comprising performing the action with regard to the at least a portion of the recognized text element.

13. The method of claim 12, wherein said performing the action is executed in response to receiving a user confirmation to perform the action with regard to the at least a portion of the recognized text element.

14. The method of claim 12, wherein said performing the action with regard to the at least a portion of the recognized text element comprises at least one:
    entering the at least a portion of the recognized text element into calendar;
    entering the at least a portion of the recognized text element into contacts database;
    showing an address on a map;
    creating an itinerary to a destination;
    saving the at least a portion of the recognized text element.

15. The method claim 1, further comprising storing the first portion of the image and the second portion of the image in association with the recognized text element.

16. The method of claim 1 further comprising storing the image and both the first portion of the image and the second portion of the image, in association with the recognized text element.

17. The method of claim 1, further comprising indexing at least one of: the recognized text element, the image, the first portion of the image and the second portion of the image, the at least a portion of the recognized text element, and storing a derived index.

18. An electronic device comprising a display screen, a processor coupled to the display screen, the processor being configured to have access to computer readable commands which commands, when executed, cause the processor to:
- display an image on the display screen;
- receive a user selection of a first portion of the image;
- responsive to the user selection of the first portion of the image, the first portion of the image containing a selected text portion, perform text recognition of the selected text portion and of an unselected text portion, the unselected text portion located in a second portion of the image being distinct from the selected text portion located in the first portion of the image, the second portion of the image being immediately adjacent to the first portion of the image;
- after performing the text recognition of the selected text portion and of the unselected text portion, determine if the unselected text portion should form part of a recognized text element, to determine comprises to detect at least one of a logical continuation and a logical extension of the unselected text portion relative to the selected text portion;
- responsive to determining that the unselected text portion should form part of the recognized text element, create the recognized text element that includes the selected text portion and at least a portion of the unselected text portion;
- the display screen being a touch screen, wherein computer readable commands, when executed, further cause the processor to receive the user selection of the first portion of the image by identifying a touch action performed by the user on the touch screen; and
- wherein the touch action performed by the user on the touch screen is sweeping a portion of the blurred version of the image, the portion of the blurred version of the image corresponding to the first portion of the image.

* * * * *